United States Patent
Panchal et al.

(10) Patent No.: US 10,027,448 B2
(45) Date of Patent: Jul. 17, 2018

(54) METHODS OF ADAPTING CODEC DATA RATE BASED ON RADIO CONDITION TO IMPROVE LTE SERVICE COVERAGE AND CAPACITY

(71) Applicant: Verizon Patent and Licensing Inc., Arlington, VA (US)

(72) Inventors: Jignesh S. Panchal, Hillsborough, NJ (US); Rakshit Trivedi, Parsippany, NJ (US); Sanyogita Shamsunder, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 14/932,697

(22) Filed: Nov. 4, 2015

(65) Prior Publication Data

US 2016/0381691 A1 Dec. 29, 2016

Related U.S. Application Data

(60) Provisional application No. 62/186,133, filed on Jun. 29, 2015.

(51) Int. Cl.
| | |
|---|---|
| *H04L 1/20* | (2006.01) |
| *H04W 24/10* | (2009.01) |
| *H04W 72/08* | (2009.01) |
| *H04W 28/22* | (2009.01) |

(52) U.S. Cl.
CPC ............. *H04L 1/203* (2013.01); *H04W 28/22* (2013.01)

(58) Field of Classification Search
CPC ........ H04L 1/203; H04W 24/10; H04W 28/22
See application file for complete search history.

(56) References Cited

U.S. PATENT DOCUMENTS

| | | | | |
|---|---|---|---|---|
| 2014/0192698 | A1* | 7/2014 | Anchan | H04W 4/06 370/312 |
| 2016/0119384 | A1* | 4/2016 | Karimli | H04L 43/0829 370/252 |
| 2016/0323334 | A1* | 11/2016 | Saba | H04L 65/4069 |
| 2017/0006457 | A1* | 1/2017 | Harada | H04W 72/0453 |

\* cited by examiner

*Primary Examiner* — Alex Skripnikov
*Assistant Examiner* — Nicole King (57) ABSTRACT

Variable bitrate ("VBR")-based applications may use physical layer metrics, associated with a radio access network ("RAN"), in order to select a data rate and/or codec at which to send and/or receive data. Such VBR-based applications may include voice call application, video streaming applications, or the like. An application programming interface ("API") between the physical layer and the application layer of a user device may facilitate the analysis of the physical layer metrics of the RAN. The RAN may also, or alternatively, provide physical layer metrics to the user device (e.g., via control signaling). The RAN may enforce constraints on maximum or minimum data rates, and/or may specify codecs that should be used.

20 Claims, 8 Drawing Sheets

METHODS OF ADAPTING CODEC DATA RATE BASED ON RADIO CONDITION TO IMPROVE LTE SERVICE COVERAGE AND CAPACITY

CROSS-REFERENCE TO RELATED APPLICATION

This application claims the benefit of priority to U.S. Provisional Patent Application No. 62/186,133, titled "METHODS OF ADAPTING CODEC DATA RATE BASED ON RADIO CONDITION TO IMPROVE LTE SERVICE COVERAGE AND CAPACITY," filed Jun. 29, 2015, the contents of which are incorporated herein by reference.

BACKGROUND

Wireless user devices, such as cellular smartphones, may run software applications, such as video streaming applications, audio/video teleconferencing applications, etc., in which data may be sent and/or received by the wireless user devices via a wireless telecommunications network, such as a cellular network. Some software applications use variable bitrate ("VBR") techniques, in which the data rate of data sent and/or received by the applications are increased or decreased. For example, at the application layer of a user device, an application may communicate with an application server via the Internet, in order to determine an end-to-end bandwidth and/or latency of application traffic that is sent between the user device and the application server, and may request adjustments to the data rate of uplink and/or downlink traffic based on the measured bandwidth and/or latency.

DETAILED DESCRIPTION OF PREFERRED EMBODIMENTS

The following detailed description refers to the accompanying drawings. The same reference numbers in different drawings may identify the same or similar elements.

Today there is no clear mechanism (neither in Third Generation Partnership Project ("3GPP") Long-Term Evolution ("LTE") standard, nor in vendor proprietary solutions) in place to provide feedback to devices, that utilize VBR techniques, to alter the behavior of VBR-based applications based on deteriorating or improving radio conditions (e.g., conditions of a RAN of a cellular telecommunications network, via which devices communicate with application servers). Applications may have their own feedback mechanism to alter their behavior based on packet loss, increase or decrease in latency and round-trip-time, throughput, and/or other factors. However, using such application-based feedback takes time, adds latency to the reaction of RAN problems, and, in turn, impacts the end-user-experience.

For example, a deterioration/change in radio conditions of a RAN results in an increase in packet error rates at the application layer, which directly impacts the user experience. Similarly, if there is an improvement or change in the radio conditions, the packet error or corruption rates may go down. In VBR situations, this may result in a possible scenario where the user may be upgraded to a better, higher rate, experience.

Another problem is that in some geographic areas, the coverage provided by a base station of a wireless telecommunications network (e.g., an evolved Node B ("eNodeB"), in an LTE environment) can be very challenging due to the topography, a high volume of calls, or other types of conditions. Calls (or other traffic), that consumes a relatively high data rate, will consume more resources and, in turn, require better conditions to fulfill the connectivity, thus potentially affecting the remaining available resources and users.

Some implementations, described herein, may improve the end user experience by initiating a rate change (e.g., in VBR-based applications) sooner than that which is possible by feedback at the application layer. For example, the radio link layers, of a user device (e.g., a mobile telephone) can directly convey current radio conditions to upper layers of the protocol stack, directly to the application layer, causing a VBR-based application to react to changes much quicker and greatly improving the end user experience.

Figure 1:
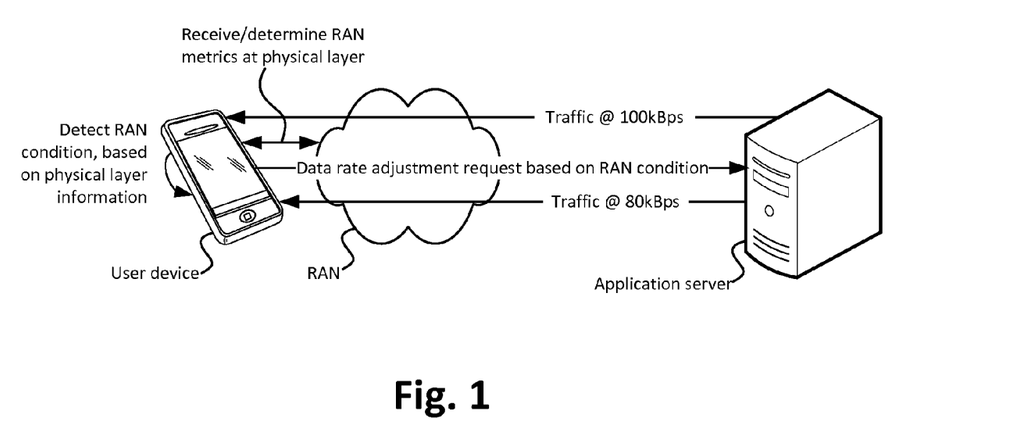
FIG. 1 illustrates an example overview of one or more implementations described herein, in which a user device may use VBR techniques in accordance with radio access network ("RAN") conditions detected based on physical layer information.

For example, as shown in FIG. 1, a user device may receive traffic from an application server. Assume that the traffic is application traffic, associated with a VBR-based application running on the user device (i.e., an application that is capable of requesting, receiving, and/or processing data at varying data rates). As shown, the traffic may be received at a first data rate (i.e., 100 kilobytes per second ("kBps")). As further shown, the traffic may be received, by the user device, via a RAN (e.g., an LTE RAN associated with a wireless telecommunications network).

As part of conventional operation of the RAN and/or the user device, the user device may receive or determine, at the physical layer of a protocol stack implemented by the user device, metrics or other types of information associated with the RAN. For example, the user device may receive information regarding a radio frequency ("RF") condition of the RAN (e.g., a signal-to-noise-and-interference ratio ("SINR")), block error rate ("BLER"), frame error rate ("FER"), signal path loss, and/or other types of information. This information may be received as part of conventional or standard signaling that occurs between the user device and the RAN (e.g., as part of Radio Resource Control ("RRC") signaling, and/or another type of signaling).

Additionally, or alternatively, conventional or standard techniques may allow the physical layer of the user device to measure or determine one or more metrics associated with the RAN. For example, the user device may monitor the status of a queue (e.g., an egress (or "uplink") queue), via which traffic is outputted via the RAN. If the fullness of the queue increases over a particular period of time, the increase in the fullness of the queue may generally indicate congestion in the RAN during the particular period of time. In some implementations, a user device may determine uplink throughput, based on a quantity of packets outputted from the user device (e.g., from one or more egress queues) via the RAN.

In accordance with some implementations, the physical layer of the user device may pass information regarding one or more of the metrics to the application layer (e.g., to one or more particular applications, such as a VBR-based application) of the user device. The application may determine, based on one or more of the received metrics, that a different data rate should be used by the application. For instance, if the RAN is capable of providing traffic at a relatively low throughput (e.g., lower than the present data rate at which the application is receiving traffic), if the SINR is below a threshold, if the BLER is higher than a threshold, if the FER is higher than a threshold, if the signal path loss is higher than a threshold, if the fullness of the queue at the user device is increasing, etc., then the application may output a request to the application server to lower the data rate of traffic sent from the application server to the user device. As another example, if the RAN is capable of providing traffic at a relatively high throughput (e.g., higher than the present data rate), if the SINR is above a threshold, if the BLER is lower than a threshold, etc., then the application may output a request to the application server to increase the data rate of traffic sent from the application server to the user device.

In the example shown in FIG. 1, assume that the "data rate adjustment request based on RAN condition" is a request to lower the data rate. As illustrated, based on this request, the application server may lower the data rate of the traffic to 80 kBps.

Figure 2:
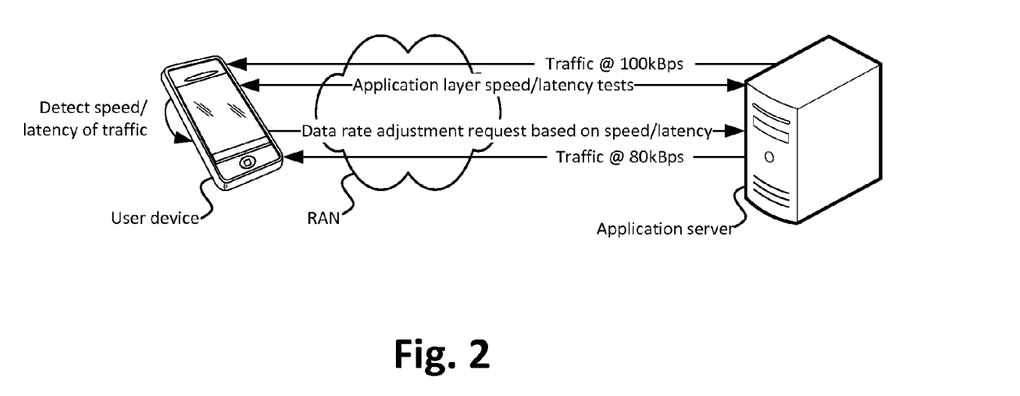
FIG. 2 illustrates an example overview of a technique in which application layer messaging is used to determine the speed and/or latency of traffic between an application server and a VBR-based application.

FIG. 2 illustrates an example technique, in which application layer messaging is used to determine the throughput (e.g., "speed") and/or latency of traffic between an application server and a user device. For example, as shown, the application server may output traffic to the user device at 100 kBps. The user device and the application server may communicate, using application layer traffic (i.e., an application, running on the user device may communicate with an application running on the application server), to determine the throughput and/or latency of traffic between the user device and the application server. For example, the user device application may run a "speed" and/or "latency" test, whereby traffic is sent to, and/or received from, the application server, and the uplink and/or downlink throughput and/or latency are determined based on the test. Based on the results of the speed/latency tests, the user device and/or the application server may determine that a data rate adjustment should be performed, and the application server may output traffic at a different data rate (i.e., 80 kBps, in this example).

As may be apparent, performing latency and/or speed tests may be undesirable, as such tests necessitate the use of additional traffic. The additional traffic may consume network resources of the user device, the application server, and/or any network(s) via which the additional traffic traverses. Furthermore, it may take time (e.g., several seconds) to perform such tests, during which time the user's experience may be degraded. In contrast, using already available physical layer information (e.g., as mentioned above with respect to FIG. 1) may allow for faster adjustments, without introducing additional traffic between the user device and the application server.

Figure 3:
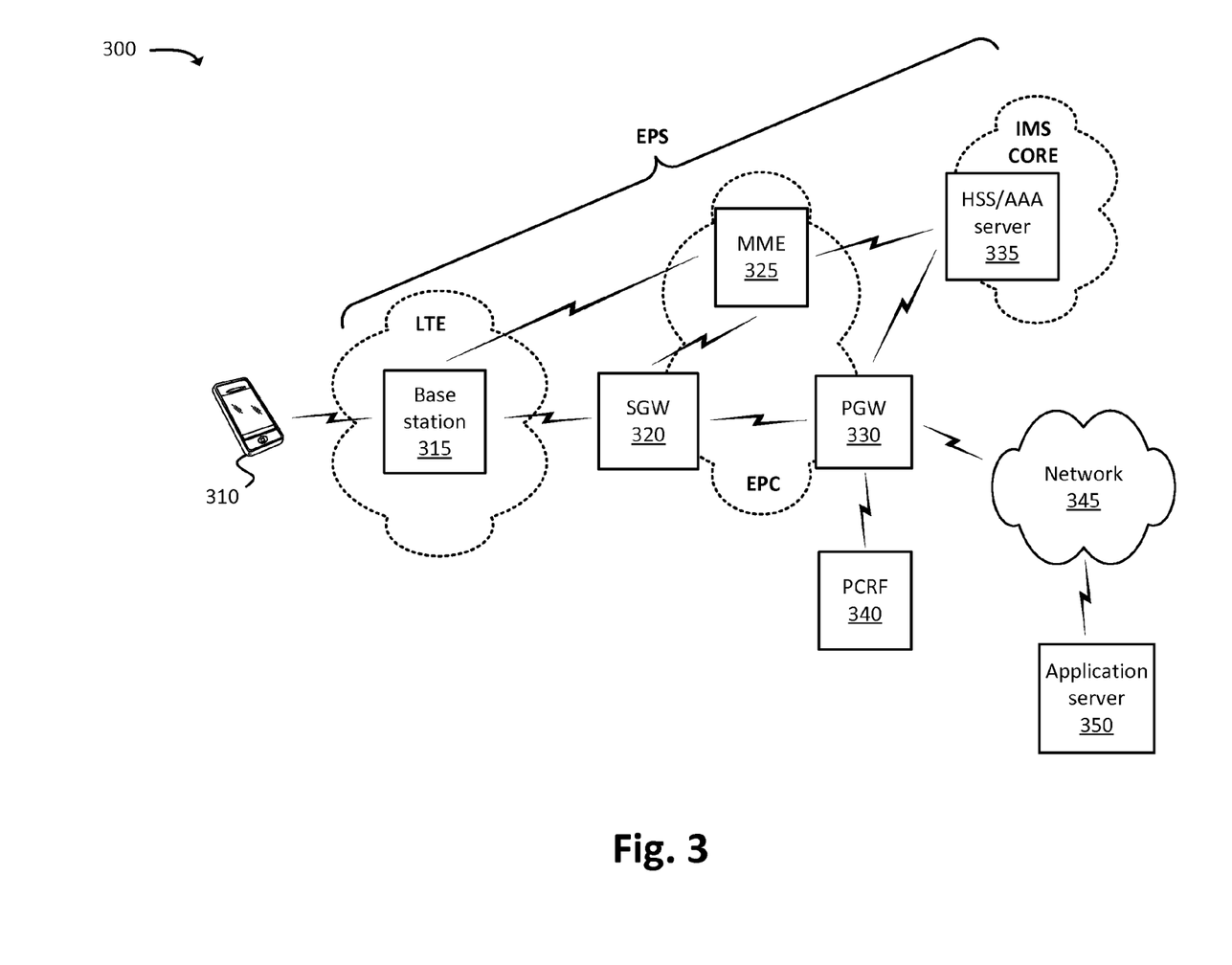
FIG. 3 illustrates an example environment, in which systems and/or methods, described herein, may be implemented.

FIG. 3 illustrates an example environment 300, in which systems and/or methods described herein may be implemented. Environment 300 may correspond to the environment in which system 300 is implemented. In other implementations, system 300 may be implemented in other environments. In this particular example, environment 300 may correspond to an LTE/Evolved Packet System ("EPS") cellular network.

As shown in FIG. 3, environment 300 may include base station 315, serving gateway ("SGW") 320, mobility management entity device ("MME") 325, packet data network ("PDN") gateway ("PGW") 330, home subscriber server ("HSS")/authentication, authorization, accounting ("AAA") server (hereinafter referred to as "HSS/AAA server") 335, policy charging and rules function ("PCRF") 340, and network 345.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections.

Environment 300 may include an EPS system that includes a LTE network and/or an Evolved Packet Core ("EPC") network that operate based on a 3GPP wireless communication standard. The LTE network may be, or may include, a RAN that includes one or more base stations 315, some or all of which may take the form of an eNodeB. The EPC network may include one or more SGWs 320, MMEs 325, and/or PGWs 330, and may enable user device 310 to communicate with network 345 and/or an Internet protocol ("IP") multimedia subsystem ("IMS") core network. The IMS core network may include HSS/AAA server 335, and may manage authentication, session initiation, account information, a user profile, etc. associated with user device 310.

Base station 315 may include one or more network devices that receive, process, and/or transmit traffic, such as calls, audio, video, text, television programming content, and/or other data, destined for and/or received from user device 310. In one example, base station 315 may be an eNB device and may be part of the LTE network. Base station 315 may receive traffic from and/or send traffic to network 345 via SGW 320 and PGW 330. Base station 315 may send traffic to and/or receive traffic from user device 310 via an air interface.

SGW 320 may include one or more network devices that gather, process, search, store, and/or provide information. For example, SGW 320 may include a gateway, a router, a modem, a switch, a firewall, a network interface card ("NIC"), a hub, a bridge, a proxy server, or some other type of device that processes and/or transfers traffic. SGW 320 may, for example, aggregate traffic received from one or more base stations 315 and may send the aggregated traffic to network 345 and/or another network via PGW 330. SGW 320 may also aggregate traffic received from network 345 and/or another network (e.g., via PGW 330) and may send the aggregated traffic to user device 310 via one or more base stations 315.

MME 325 may include one or more computation and communication devices that gather, process, search, store, and/or provide information. For example, MME 325 may perform operations to register user device 310 with the EPS, to establish bearer channels associated with a session user device 310, to hand off user device 310 from the EPS to another network, and/or to perform other operations. MME 325 may perform policing operations on traffic destined for and/or received from user device 310.

PGW 330 may include one or more network devices, or other types of computation and communication devices, that gather, process, search, store, and/or provide information in a manner described herein. For example, PGW 330 may include a gateway, a router, a modem, a switch, a firewall, a NIC, a hub, a bridge, a proxy server, an optical add-drop multiplexer ("OADM"), and/or some other type of device that processes and/or transfers traffic. PGW 330 may aggregate traffic received from one or more SGWs 320, and may send the aggregated traffic to network 345. PGW 330 may also, or alternatively, receive traffic from network 345 and may send the traffic toward user device 310 via SGW 320, and/or base station 315.

HSS/AAA server 335 may include one or more server devices, or other types of devices, that gather, process, search, store, and/or provide information. For example, HSS/AAA server 335 may manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 310 and/or one or more other user devices 310. Additionally, or alternatively, HSS/AAA server 335 may perform authentication, authorization, and/or accounting operations associated with the subscriber and/or a communication session with user device 310.

PCRF 340 may include one or more server devices, or other types of devices, that aggregate information to and from the EPC network and/or other sources. PCRF 340 may receive information regarding policies and/or subscriptions from one or more sources, such as subscriber databases and/or from one or more users (such as, for example, an administrator associated with PCRF 340).

Network 345 may include one or more wired and/or wireless networks. For example, network 345 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 345 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of network 345 may be provided by one or more cellular network providers. That is, in some such implementations, network devices within, or associated with, network 345, may be provided by the one or more cellular network providers. In some implementations, network 345 may be communicatively coupled to one or more other networks, such as the Internet.

Application server 350 may include one or more server devices that provide content (e.g., streaming content) and/or services (e.g., streaming videoconferencing services, voice call services, etc.) to user device 310. Application server 350 may be capable of providing content and/or services on a VBR basis. For example, in accordance with some implementations, application server 350 may receive requests and/or instructions from user device 310, indicating a desired bitrate of traffic, from application server 350 to user device 310. The desired bitrate may be determined based on, for example, RAN metrics determined at the physical layer.

Figure 4:
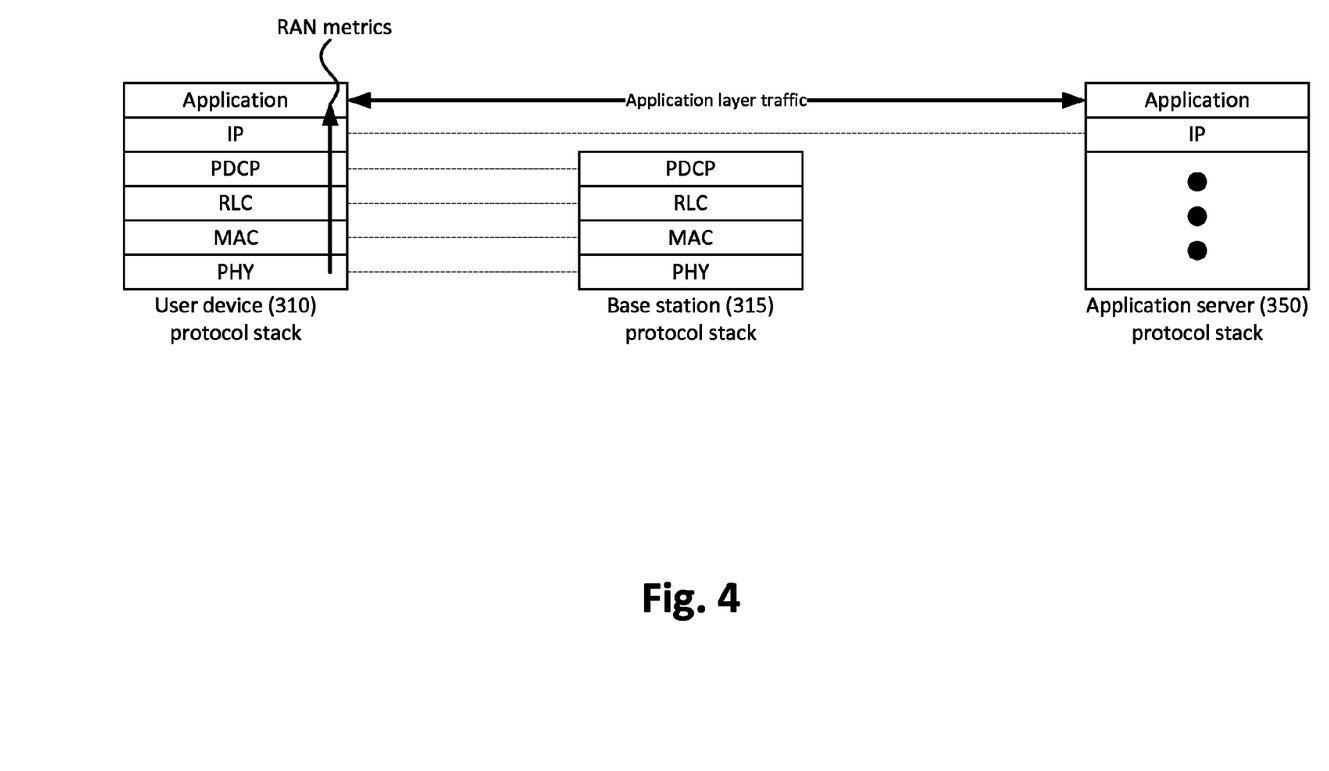
FIG. 4 illustrates an example of messaging, at various levels of a protocol stack, that may occur, in accordance with one or more implementations described herein.

FIG. 4 illustrates an example of messaging, at various levels of a protocol stack, that may occur, in order to facilitate efficient VBR techniques. For example, as shown, user device 310 and base station 315 may implement a protocol stack that includes a physical ("PHY") layer, a media access control ("MAC") layer, a radio link control ("RLC") layer, and a packet data convergence protocol ("PDCP") layer. User device 310 and application server 350 may implement an Internet Protocol ("IP") layer and an application layer. While specific layers are shown in this figure as an example, in practice, the protocol stacks (and, thus, the specific layers) implemented by user device 310, base station 315, and/or application server 350 may differ from the example described here. For example, while the layers below the IP layer, implemented by application server 350, are not shown in this figure, application server 350 may implement the same or different layers as user device 310.

The dashed lines, shown in the figure, illustrate communications between respective devices at particular layers. For example, as shown, user device 310 and base station 315 may have established a physical link (denoted by the dashed line between the PHY layers of user device 310 and base station 315). As another example, user device 310 and application server 350 may have formed an IP connection (denoted by the dashed line between the IP layers of user device 310 and application server 350). The IP connection may facilitate the end-to-end transport of traffic (e.g., application layer traffic) between the respective application layers of user device 310 and application server 350.

The physical layer of user device 310 may determine, store, and/or receive information regarding a RAN associated with base station 315. For example, the physical layer of user device 310 may store information regarding a signal quality between user device 310 and base station 315 (e.g., an SINR value), a BLER value, an FER value, a queue state of user device 310, etc. These types of information may be referred to herein, for short, as "RAN metrics."

As shown, in accordance with some implementations, the physical layer may pass one or more RAN metrics to the application layer. For example, in some implementations, the physical layer may be modified in order to allow access to one or more applications, running on user device 310. In some such implementations, the physical layer may have an application programming interface ("API"), via which applications may communicate with the physical layer (e.g., to obtain one or more RAN metrics). In some implementations, the API may "push" the RAN metrics to the application layer (e.g., may provide the RAN metrics to the application layer, without waiting for a request for the RAN metrics). In some implementations, the application layer request one or more RAN metrics, via the API. In some implementations, while the physical layer may determine and/or store many different types of RAN metrics, only some of the RAN metrics may be available via the API. In other implementations, all of the RAN metrics may be available via the API.

Figure 5:
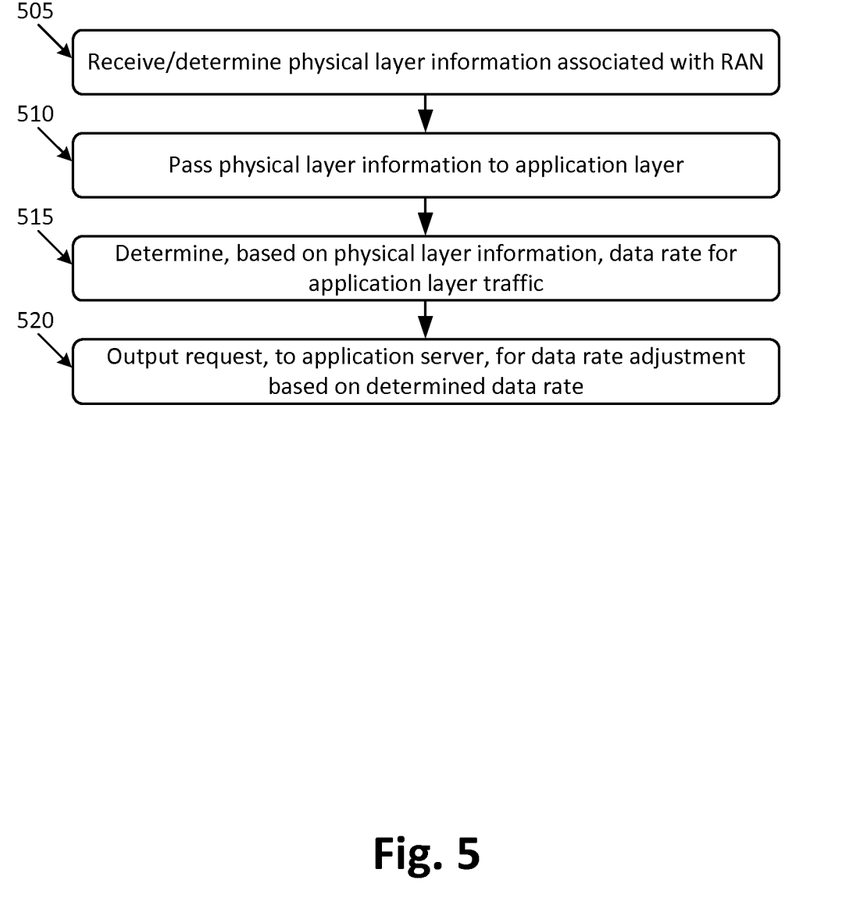
FIG. 5 illustrates a flowchart of an example process for using VBR techniques in accordance with RAN conditions detected based on physical layer information.

FIG. 5 illustrates a flowchart of an example process 500 for using VBR techniques in accordance with RAN conditions detected based on physical layer information. In some implementations, some or all of process 500 may be performed by user device 310.

As shown, process 500 may include receiving and/or determining (at 505) physical layer information associated with a RAN. For example, as described above with respect to FIG. 4, user device 310 may, at the physical layer, determine or receive metrics related to a RAN, to which user device 310 is connected.

Process 500 may also include passing (at 510) the physical layer information (e.g., the RAN metrics) to the application layer. For example, as described above with respect to FIG. 4, the physical layer of user device 310 may be associated with an API, via which the application layer (e.g., one or more particular applications) may communicate with the physical layer. Via the API, the application layer may receive, from the physical layer, one or more RAN metrics.

Process 500 may further include determining (at 515), based on the physical layer information, a data rate for application layer traffic. For example, the application may be configured to analyze one or more of the RAN metrics, received from the physical layer, and determine a data rate based on the one or more RAN metrics. For example, user device 310 may generate one or more scores, based on the one or more RAN metrics. For instance, user device 310 may generate a first score based on the SINR, a second score based on the BLER, a third score based on the FER, and so on. In some implementations, the scores may be normalized (i.e., may be set to the same range of values, such as 1-100, or some other range). As an example, a relatively high score may be generated for a relatively SINR (e.g., close to 100), a relatively high score may be generated for a relatively low BLER, etc.

In some implementations, the scores may be combined to determine an overall score, which may generally indicate the condition of the RAN. The individual scores for the different metrics may, for example, be averaged in order to obtain the overall score. In some implementations, different types of computations may be used in order to derive the overall score from the individual scores. For example, one score may be weighted higher or lower than other scores. For instance, BLER may be viewed as less important than SINR in some instances. In some such instances, SINR may be weighted higher than BLER when computing the overall score. In some implementations, the weights may be different for different applications. This may be the case in situations where different metrics are considered more important than other metrics for certain applications, while being considered less important for other applications.

The overall score may indicate a desired data rate for the application traffic. For example, a relatively high score may be associated with a relatively high data rate, while a relatively low score may be associated with a relatively low data rate. In some implementations, ranges of scores may be associated with different data rates. For example, a score of 1-10 may be associated with a lowest data rate (e.g., 10 kBps), a score of 11-50 may be associated with a next lowest data rate (e.g., 700 kBps), and a score of 51-100 may be associated with a highest data rate (e.g., 2.0 MBps).

Process 500 may additionally include outputting (at 520) a request, to an application server, for a data rate adjustment based on the determined data rate. For example, once the data rate is determined (at 515), user device 310 may output a request (e.g., via an application layer message) to application server 350, indicating the data rate. The requested data rate may be an increased data rate, compared to a previous data rate at which application server 350 is outputting traffic to user device 310, if RAN conditions improve. In some implementations, user device 310 may output (at 520) the overall score (and/or the individual scores for the metrics) to application server 350, which may itself determine the data rate (e.g., may perform functionality similar to that described above with respect to block 515).

For example, if the signal strength, between user device 310 and base station 315 increases, user device may determine (at 515) that a higher data rate can be supported, and may request (at 520) an increased data rate for traffic from application server 350. If, on the other hand, if the signal strength decreases, user device may determine (at 515) that a present data rate cannot be supported, and may request (at 520) a reduced data rate for traffic from application server 350.

In some implementations, the request to the application server may be a request for a different codec. For example, different codecs may be better suited for different data rates. For instance, a codec that exhibits relatively high compression may be better suited for a relatively low data rate, while a codec that exhibits relatively low compression may be better suited for a relatively high data rate. In some implementations, user device 310 may output a message indicating one or more of the RAN metrics (and/or a value derived from one or more RAN metrics), and application server 350 may determine an appropriate data rate and/or codec, based on the RAN metrics (or derived values).

In some implementations, the data rate adjustment request may be outputted (at 520) on a periodic basis (e.g., once per second, once every five seconds, etc.). Additionally, or alternatively, the data rate adjustment request may be outputted based on the occurrence of a triggering event. For instance, the initiation of sending or receiving application traffic (such as the beginning of a voice call, the start of a streaming video content item, etc.) may be a triggering event, based on which user device 310 may request a data rate adjustment. As another example, a triggering event may occur when certain RAN thresholds are met, such as when the signal strength rises above a threshold, when the signal strength falls below a threshold, when BLER rises above a threshold, when BLER falls below a threshold, etc.

Figure 6:
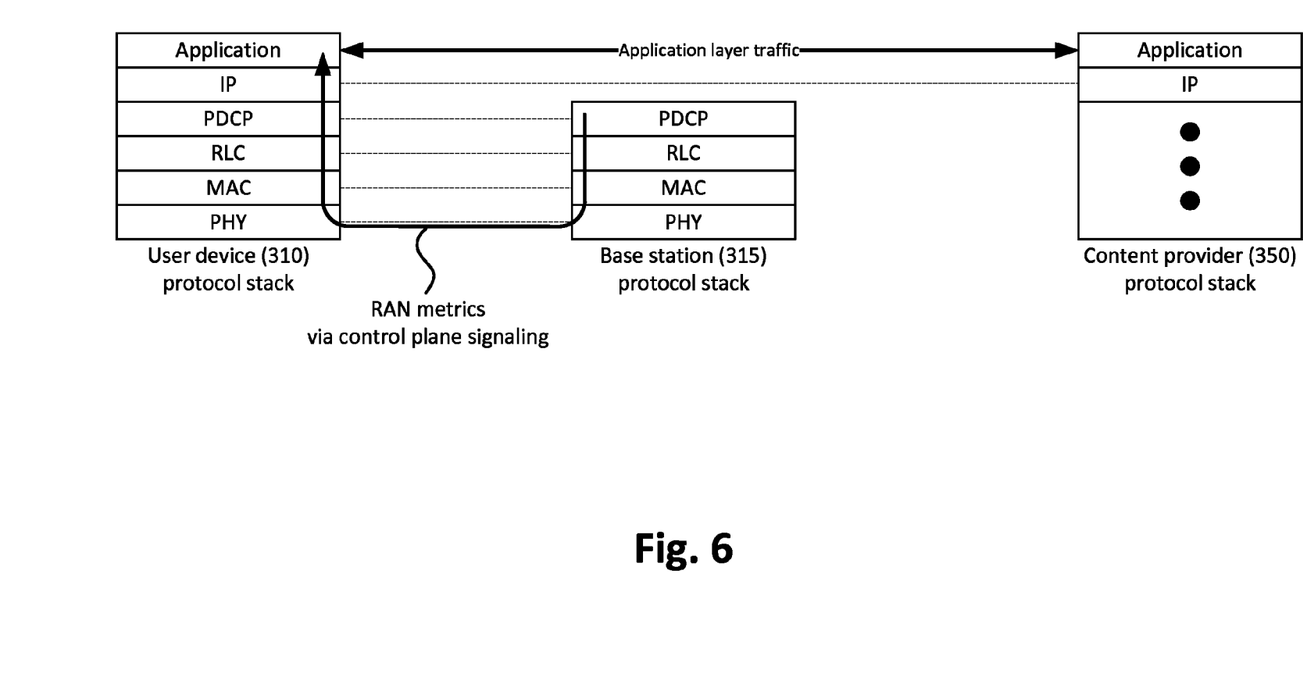
FIG. 6 illustrates another example of messaging, at various levels of a protocol stack, that may occur, in accordance with one or more implementations described herein.

FIG. 6 illustrates another example of messaging, at various levels of a protocol stack, that may occur, in accordance with one or more implementations described herein. For instance, in the example shown in FIG. 4, user device 310 uses information, from the physical layer of user device 310, to determine data rate adjustments. In this sense, the example shown in FIG. 4 may be considered to be a "RAN-independent" implementation—that is, an implementation in which base station 315 does not need to be configured to provide any additional information to user device 310, beyond conventional and/or standard implementations. The example shown in FIG. 6 may be considered to be a "RAN-dependent" implementation, in which base station 315 may provide signaling to user device 310, in order to assist user device 310 in performing VBR techniques.

In the example implementation shown in FIG. 6, base station 315 may determine some or all of the same metrics described above (e.g., SINR with respect to user device 310, BLER, FER, uplink queue status of user device 310, etc.). Base station 315 may have access to additional information, which may not typically be provided to user device 310. For example, base station 315 may be capable of determining and/or receiving information regarding network load and/or congestion status of a RAN associated with base station 315, uplink and/or downlink queue status of base station 315, a coverage area associated with base station 315, and/or other metrics. In some implementations, base station 315 may receive information regarding the load and/or congestion of application server 350 (e.g., a measure of uplink and/or downlink throughput of traffic being sent and/or received by application server 350, a measure of available uplink and/or downlink throughput associated with application server 350, etc.). Some or all of the information may be passed to user device 310, in accordance with some implementations, in order to assist user device 310 in determining a desired data rate and/or codec.

As shown in FIG. 6, base station 315 may provide the RAN metrics (e.g., the types of metrics that may not typically be accessible by user device 310) to user device 310 via control plane signaling. For example, user device 310 may provide the RAN metrics via a "container" portion of an RRC message (e.g., via an "RRC-CONTAINER"), via a system information block ("SIB"), via a master information block ("MIB"), and/or via some other type of signaling or message. In other implementations, the RAN metrics may be provided via some other type of signaling, which may include unconventional and/or proprietary signaling.

In some implementations, base station 315 may provide the RAN metrics to user device 310 as part of an initial attachment procedure, as part of an RRC connection reconfiguration, based on the occurrence of a triggering event (e.g., upon the initiation of sending or receiving application traffic, when certain RAN thresholds are met, when user device 310 changes from an "idle" mode to an "active mode" or vice versa, etc.), and/or on a periodic or intermittent basis. User device 310 may pass some or all of the information, received from base station 315, to one or more applications (e.g., one or more VBR-based applications).

Figure 7:
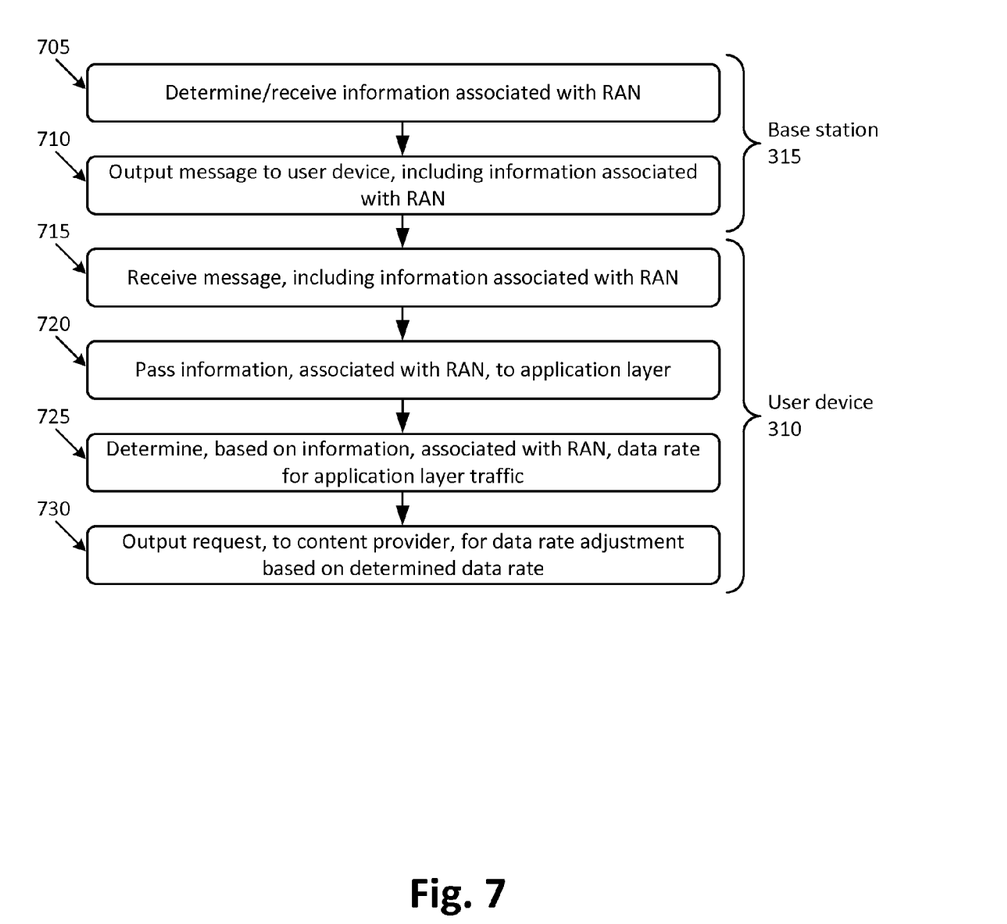
FIG. 7 illustrates a flowchart of an example process for using VBR techniques in accordance with RAN conditions detected based on information provided to a user device by a base station.

FIG. 7 illustrates a flowchart of an example process 700 for using VBR techniques in accordance with RAN conditions detected based on information provided to a user device by a base station. In some implementations, some or all of process 700 may be performed by user device 310 and/or by base station 315.

As shown, process 700 may include determining (at 705) information associated with a RAN. For example, as described above with respect to FIG. 6, base station 315 may determine or receive metrics related to a RAN associated with base station 315, to which user device 310 is connected. Some or all of these metrics may be metrics that relate to the physical layer, such as BLER, FER, uplink and/or downlink queue status (e.g., fullness of uplink and/or downlink queues at user device 310 and/or base station 315), etc. Base station 315 may maintain information on a per-user device basis; that is, base station 315 may maintain one set of BLER, FER, etc. metrics for a first user device 310 and another set of BLER, FER, etc. metrics for a second user device 310. In some implementations, base station 315 may also maintain other information regarding the RAN, including congestion and/or load information. The congestion and/or load information may be based on, for example, a total quantity of user devices 310 attached to base station 315, a quantity of active user devices 310 attached to base station 315, a quantity of idle user devices 310 attached to base station 315, an uplink and/or downlink throughput being utilized via base station 315, a quantity of used and/or available physical resource blocks ("PRBs") associated with base station 315, etc.

Process 700 may also include outputting (at 710) a message to the user device, including information associated with the RAN. As mentioned above, for example, base station 315 may output the message as part of an RRC message (e.g., in an "RRC-CONTAINER"), a SIB, a MIB, and/or some other type of message. As also discussed above, base station 315 may output the message upon initial attachment of base station 315, as part of an RRC reconfiguration procedure, upon the occurrence of a triggering event, and/or on a periodic or intermittent basis.

Process 700 may further include receiving (at 715) the message, including the information associated with the RAN, from the base station. For example, user device 310 may receive the message, outputted (at 710) by base station 315.

Process 700 may further include passing (at 720) the information, associated with the RAN, to an application layer of the user device. For example, as similarly described above, an API may allow one or more applications, of user device 310, to request and/or otherwise receive the information from the physical layer of user device 310. In some implementations, in addition to the information associated with the RAN, received from base station 315, the application layer of user device 310 may receive physical layer information from the physical layer of user device 310, which was not received from base station 315 (e.g., physical layer information determined by user device 310, without having received the information from base station 315). In this manner, the application layer may receive physical layer information as determined by both user device 310 and base station 315.

Process 700 may additionally include determining (at 725), based on the information associated with the RAN, a data rate for application layer traffic. For example, as described above, user device 310 may generate one or more scores based on the received information associated with the RAN, and/or may generate and overall score. The overall score may be used to determine the desired data rate, and/or a desired codec.

In some implementations, the desired data rate and/or codec may be based on one or more thresholds, in addition to, or in lieu of, scores associated with the metrics. For example, in some implementations, if a particular metric is above a certain threshold, a first data rate and/or codec may be selected, while if the particular metric is below the certain threshold, a second data rate and/or codec may be selected.

Process 700 may also include outputting (at 730) a request, to a content provider, for a data rate adjustment based on the determined data rate. For example, user device 310 may output a request to application server 350, to provide content at the determined data rate and/or codec. Additionally, or alternatively, as mentioned above, user device 310 may provide raw data (e.g., values of one or more metrics and/or RAN information) to application server 350, which itself may select a data rate and/or codec. In some implementations, in addition to, or in lieu of outputting (at 730) a request to the content provider, user device 310 may adjust an uplink data rate and/or codec (e.g., a data rate and/or codec that user device 310 uses to output traffic), based on information associated with the RAN (e.g., based on physical layer information determined by user device 310, and/or RAN information received from base station 315).

Figure 8:
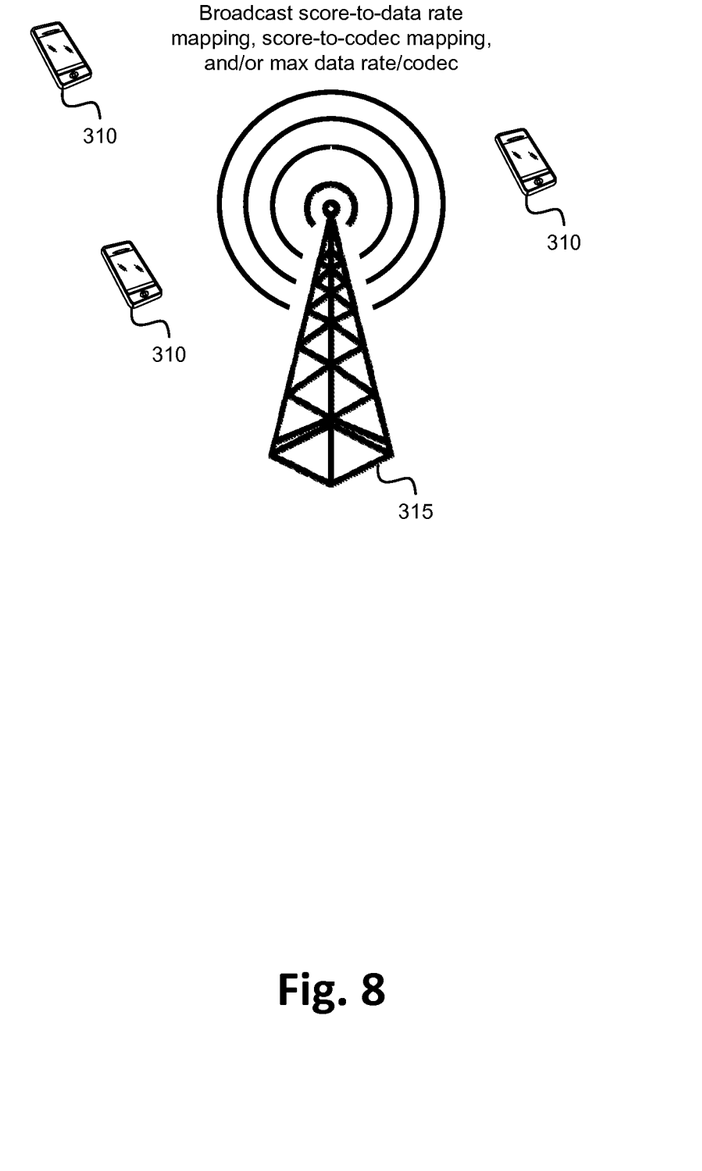
FIG. 8 illustrates an example of mappings and/or maximum data rates being broadcasted by a base station.

FIG. 8 illustrates parameters, such as constraints on data rates and/or codecs, being broadcasted by a base station. The parameters may include any parameters used (e.g., by user device 310) in selecting a data rate and/or codec for a VBR-enabled application, based on RAN metrics. Base station 315 may broadcast the parameters as part of a SIB, MIB, and/or other type of signaling. The parameters may be "broadcasted," in the sense that base station 315 need not establish connections with, or specifically address the parameters to, user devices 310 within range of, or attached to, base station 315.

The parameters may include, for example, a mapping of scores to data rates. For instance, assuming that overall scores (e.g., as discussed above with respect to block 515) are set to a scale of 1-100, the mapping may indicate that a score of 1-10 is associated with a lowest data rate (e.g., 10 kBps), a score of 11-50 is associated with a next lowest data rate (e.g., 700 kBps), and a score of 51-100 is associated with a highest data rate (e.g., 2.0 MBps).

As another example, the parameters may include a mapping of scores to codecs. For instance, assuming that overall scores are set to a scale of 1-100, the mapping may indicate that a score of 1-10 is associated with a first codec, a score of 11-50 is associated with a second codec, and a score of 51-100 is associated with a third codec.

The parameters may, in some implementations, include weights for different RAN metrics, which may be used in generating overall scores. For example, BLER may be viewed as less important than SINR in some instances. In some such instances, SINR may be weighted higher than BLER. In some implementations, the weights may be different for different applications or application types (e.g., video streaming applications, voice call application, video-conferencing applications, etc.).

In some implementations, the parameters may include a maximum data rate, a minimum data rate, a fixed data rate, and/or a specific codec. The parameters may be determined dynamically, in order to adjust for ever-changing RAN conditions. For example, in situations where the RAN is relatively congested (e.g., greater than a threshold quantity of user devices are attached to base station 315, the fullness of ingress and/or egress queues at base station 315 is increasing over a particular period of time, and/or based on other physical layer RAN metrics), base station 315 may enforce a maximum data rate by broadcasting a parameter, that indicates the maximum data rate. The parameter(s) may also be set manually, such as by an owner or operator of base station 315. For instance, the owner and/or operator may desire for a particular codec to be used when user devices 310 send and/or receive traffic via base station 315; this codec may be indicated by the parameter(s) broadcasted by base station 315.

Additionally, or alternatively, in some implementations, the parameters may be automatically adjusted based on time of day, day of week, season, and/or based on some other temporal factor. For example, if base station 315 is near an office building, it may be the case that base station 315 experiences heavy loads during Mondays through Fridays, 9:00 AM through 5:00 PM. During these times, base station 315 may enforce a data rate constraint by broadcasting parameters indicating a maximum data rate. In some implementations, combinations of different factors may be used in indicating a maximum data rate (e.g., time of day and network congestion).

Figure 9:
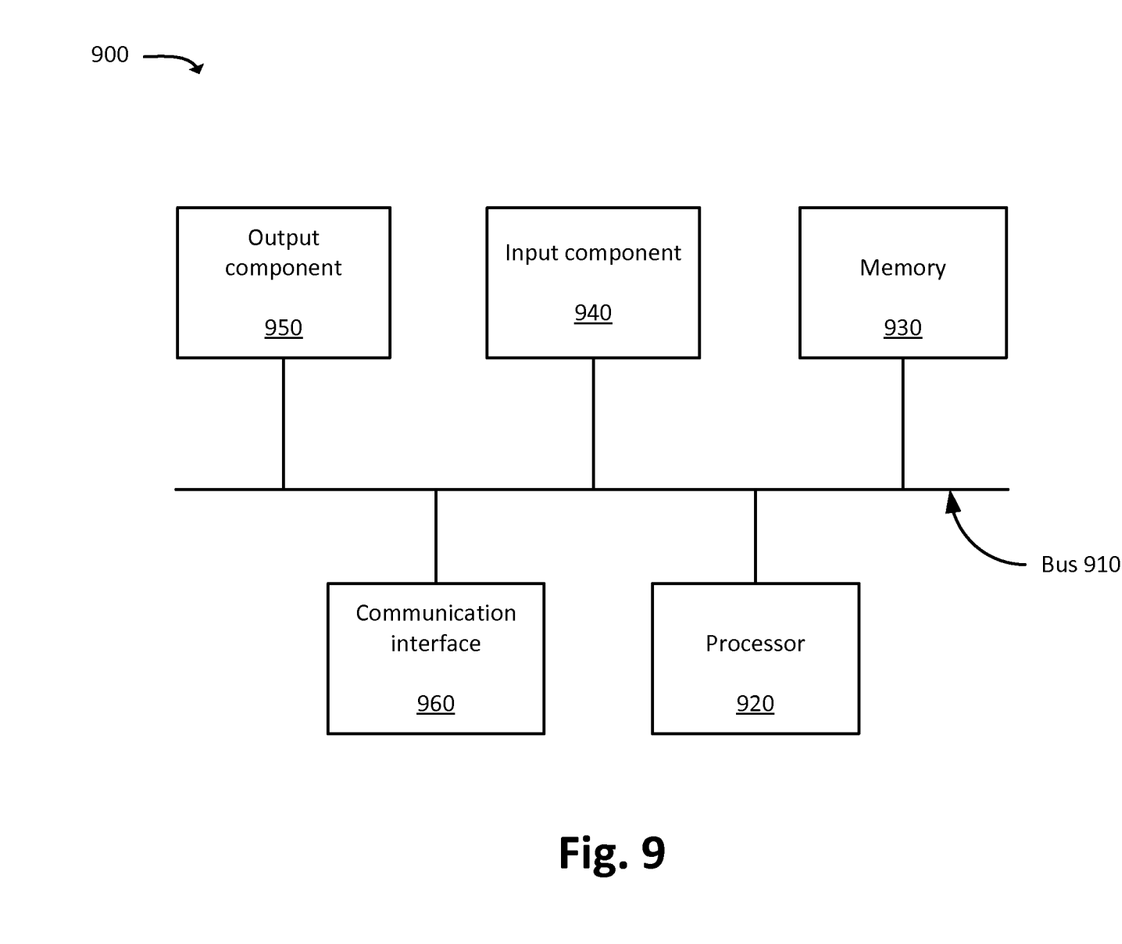
FIG. 9 illustrates example components of a device, in accordance with some implementations described herein.

FIG. 9 is a diagram of example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, in some implementations, various techniques, some examples of which have been described above, may be used in combination, even though such combinations are not explicitly discussed above. Furthermore, some of the techniques, in accordance with some implementations, may be used in combination with conventional techniques. For example, a user device may use physical layer RAN metrics (e.g., as described above with respect to FIG. 5) in addition to a conventional technique, in which the application layer of the user device determines a throughput and/or latency of traffic between the user device and an application server. A VBR-enabled application, of the user device, may use the throughput and/or latency, as determined at the application layer, as a factor when determining a data rate and/or codec to use for the VBR-enabled application (e.g., may incorporate a score, associated with the throughput and/or latency, as determined at the application layer, into an overall score used to select a data rate and/or codec).

Furthermore, while the above description is provided in the context of determining data rates and/or codecs based on physical layer information, similar techniques, that are within the scope of implementations claimed herein, may be used to select data rates and/or codecs based on link layer information, network layer information, and/or other layers (e.g., layers that are "below" the application layer). That is, such information may be used, without necessitating an application layer throughput and/or latency determination (sometimes referred to as a "speed test" and a "ping test," respectively).

Additionally, while series of blocks have been described with regard to FIGS. 5 and 7, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms) as used herein to describe a relationship of a value to a threshold, may be used interchangeably with the term "greater than or equal to" (or similar terms). Similarly, the term "less than" (or similar to as used herein to describe a relationship of a value to a threshold, may be used interchangeably with the term "less than or equal to" (or similar terms). As used herein, "exceeding" a threshold (or similar terms) may be used interchangeably with "being greater than threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
   a non-transitory computer-readable medium, storing a set of processor-executable instructions; and
   one or more processors configured to execute the processor-executable instructions, wherein executing the processor-executable instructions causes the one or more processors to:
   implement a plurality of layers, the layers including at least:
      a physical layer, and
      an application layer;
   determine one or more metrics, at the physical layer, associated with a radio access network ("RAN"), to which the user device is attached;
   receive mapping information, that indicates different data rates and codecs that are associated with different scores, from a base station associated with the RAN, the mapping information having been broadcasted by the base station;
   provide, from the physical layer and to an application that is associated with the application layer and is running on the user device, via an application programming interface ("API"), information regarding the one or more metrics,
      wherein the application sends or receives traffic, via the RAN, using a variable bitrate ("VBR") technique,
      wherein the traffic sent or received by the application is associated with one or more codecs;
   generate, by the application, a score based on the one or more metrics associated with the RAN;
   select, by the application and based on the received information regarding the one or more metrics at the physical layer:
      a particular data rate, and
      a particular codec, out of a plurality of candidate codecs, the selecting including comparing the generated score to the mapping information to identify that the particular data rate and the particular codec are indicated, in the mapping, as being associated with the generated score; and operate, by the application, at the selected particular data rate and using the selected particular codec.

2. The user device of claim 1, wherein the one or more metrics include at least one of:

a signal to interference plus noise ("SINR") ratio between the user device and a base station of the RAN, or a signal path loss of a signal between the user device and the base station.

3. The user device of claim 1, wherein at least one of the one or more metrics are provided to the user device by a base station of the RAN.

4. The user device of claim 3, wherein the at least one of the one or more metrics are provided to the user device via Radio Resource Control ("RRC") signaling.

5. The user device of claim 4, wherein the at least one of the one or more metrics are provided to the user device via a System Information Block ("SIB").

6. The user device of claim 1, wherein the generated score is an overall score, wherein executing the processor-executable instructions, to generate the overall score further causes the one or more processors to:

generate a first score for a first metric, of the one or more metrics;

generate a second score for a second metric, of the one or more metrics; and generate the overall score based on the first and second scores, wherein the particular data rate is selected based on the generated overall score.

7. The user device of claim 1, wherein when operating, by the application, at the selected particular data rate, the user device is configured to perform at least one of:

outputting a request, to an application server associated with the application, to provide content at the selected particular data rate, outputting a request, to the application server, to provide content using the selected particular codec, outputting traffic, to the application server, at the selected particular data rate, or outputting traffic, to the application server, using the selected particular codec.

8. The user device of claim 1, wherein the one or more metrics include a block error rate ("BLEW") associated with the user device with respect to the RAN.

9. The user device of claim 1, wherein the one or more metrics include a frame error rate ("FER") associated with the user device with respect to the RAN.

10. A method, comprising:

determining, by a user device, one or more metrics associated with a radio access network ("RAN") to which the user device is attached, the one or more metrics being further associated with a physical layer of the user device;

receiving, by the user device, mapping information, that indicates different data rates and codecs that are associated with different scores, from a base station associated with the RAN, the mapping information having been broadcasted by the base station;

providing, from the physical layer and to an application that is running on the user device and is associated with an application layer of the user device, via an application programming interface ("API"), information regarding the one or more metrics, wherein the application sends or receives traffic, via the RAN, using:

a variable bitrate ("VBR") technique, and one or more codecs;

generating, by the application running on the user device, a score based on the one or more metrics associated with the RAN;

selecting, by the application running on the user device and based on the received information regarding the one or more metrics at the physical layer:

a particular data rate, and a particular codec, of a plurality of candidate codecs, the selecting including comparing the generated score to the mapping information to identify that the particular data rate and the particular codec are indicated, in the mapping, as being associated with the generated score; and operating, by the application running on the user device, at the selected particular data rate and using the selected particular codec.

11. The method of claim 10, wherein the one or more metrics include at least one of:

a signal to interference plus noise ("SINR") ratio between the user device and a base station of the RAN, a block error rate ("BLER") associated with the user device with respect to the RAN, a frame error rate ("FER") associated with the user device with respect to the RAN, or a signal path loss of a signal between the user device and the base station.

12. The method of claim 10, wherein at least one of the one or more metrics are provided to the user device by a base station of the RAN.

13. The method of claim 12, wherein the at least one of the one or more metrics are provided to the user device via Radio Resource Control ("RRC") signaling.

14. The method of claim 12, wherein the at least one of the one or more metrics are provided to the user device via a System Information Block ("SIB").

15. The method of claim 10, wherein the generated score is an overall score, the method further comprising:

generating a first score for a first metric, of the one or more metrics;

generating a second score for a second metric, of the one or more metrics; and generating the overall score based on the first and second scores, wherein the particular data rate is selected based on the generated overall score.

16. The method of claim 10, wherein operating, by the application, at the selected particular data rate, includes at least one of:

outputting a request, to an application server associated with the application, to provide content at the selected particular data rate, outputting a request, to the application server, to provide content using the selected particular codec that is associated with the selected particular data rate, outputting traffic, to the application server, at the selected particular data rate, or outputting traffic, to the application server, using the selected particular codec.

17. A system, comprising:

a base station of a wireless telecommunications network, the base station being configured to:

broadcast information regarding one or more physical layer parameters of a radio access network ("RAN") implemented by the base station;

broadcast a mapping that associates scores, generated based on physical layer parameters, with data rates and codecs; and a user device configured to:
  receive the information, regarding the one or more physical layer parameters of the RAN, broadcasted by the base station;
  receive the mapping broadcasted by the base station;
  generate a score based on at least one of the one or more physical layer parameters of the RAN;
  compare the generated score to scores indicated by the mapping broadcasted by the base station;
  select a data rate and a codec, based on the generated score, as determined based on the comparing; and
  operate a variable bitrate ("VBR")-enabled application, based on the selected data rate and codec.

18. The system of claim 17, wherein the one or more physical layer parameters are broadcasted by the base station via at least one of:
  a Radio Resource Control ("RRC") message,
  a System Information Block ("SIB"), or
  a Master Information Block ("MIB").

19. The system of claim 17, wherein the one or more physical layer parameters include information regarding at least one of:
  a quantity or proportion of available physical resource blocks ("PRBs") associated with the base station, or
  a quantity or proportion of unavailable PRBs associated with the base station.

20. The system of claim 17, wherein the one or more physical layer parameters include information regarding a fullness of one or more queues, associated with the base station.

* * * * *